United States Patent
Lineton et al.

(10) Patent No.: US 7,458,358 B2
(45) Date of Patent: Dec. 2, 2008

(54) THERMAL OXIDATION PROTECTIVE SURFACE FOR STEEL PISTONS

(75) Inventors: Warran Lineton, Ann Arbor, MI (US); Miguel Azevedo, Ann Arbor, MI (US)

(73) Assignee: Federal Mogul World Wide, Inc., Southfield, MI (US)

( * ) Notice: Subject to any disclaimer, the term of this patent is extended or adjusted under 35 U.S.C. 154(b) by 20 days.

(21) Appl. No.: 11/431,297

(22) Filed: May 10, 2006

(65) Prior Publication Data
US 2007/0261663 A1 Nov. 15, 2007

(51) Int. Cl.
 *B32B 15/18* (2006.01)
(52) U.S. Cl. .................................. 123/193.6
(58) Field of Classification Search ............. 123/193.6; 428/679, 608; 427/446, 449; 92/223
 See application file for complete search history.

(56) References Cited

U.S. PATENT DOCUMENTS

| | | | |
|---|---|---|---|
| 3,892,207 A * | 7/1975 | Weise et al. ................. 123/305 |
| 4,434,189 A * | 2/1984 | Zaplatynsky ................ 427/556 |
| 4,708,752 A | 11/1987 | Kar |
| 4,781,770 A | 11/1988 | Kar |
| 4,832,982 A | 5/1989 | Mori et al. |
| 4,834,806 A | 5/1989 | Hashimoto et al. |
| 4,902,359 A | 2/1990 | Takeuchi et al. |
| 4,966,748 A | 10/1990 | Miyasaka et al. |
| 4,974,498 A * | 12/1990 | Lemelson .................... 92/223 |
| 5,014,605 A * | 5/1991 | Santi ........................... 92/223 |
| 5,084,113 A | 1/1992 | Mori et al. |
| 5,194,304 A * | 3/1993 | McCune et al. ............. 427/449 |
| 5,230,755 A * | 7/1993 | Pierantoni et al. ........... 148/516 |
| 5,321,224 A | 6/1994 | Kamimura et al. |
| 5,554,415 A * | 9/1996 | Turchan et al. ............ 427/248.1 |
| 5,640,667 A | 6/1997 | Freitag et al. |
| 5,715,270 A * | 2/1998 | Zediker et al. ................ 372/75 |

(Continued)

FOREIGN PATENT DOCUMENTS

DE 19740205 A1 3/1999

(Continued)

OTHER PUBLICATIONS

"Cold Spray: A new Technology" by Julio Villafuerte, article from "Welding Journal," pp. 24-29, May 2005.

(Continued)

*Primary Examiner*—M. McMahon
(74) *Attorney, Agent, or Firm*—Robert L. Stearns; Dickinson Wright PLLC

(57) ABSTRACT

A piston (120) and method for making a piston (120) for a fuel-injected diesel engine adapted to withstand the damaging effects of fuel injection plume-induced oxidation in the regions of the piston bowl (134) and rim (130). The surfaces of the piston crown (126) targeted by the fuel injection plume (138) are first coated with a corrosion-resistant and oxidation-resistant composition applied as a slurry or by a thermal spraying technique, such as HVOF or plasma spraying. Thereafter, a high energy industrial laser beam irradiates the as-sprayed coating to increase its density, while simultaneously reforming its microstructure so as to fuse, alloy, and materially bond the coating material with the underlying steel substrate, thereby resulting in a durable protective surface for the steel piston crown (126).

14 Claims, 5 Drawing Sheets

U.S. PATENT DOCUMENTS

| | | | |
|---|---|---|---|
| 5,759,932 A | 6/1998 | Sangeeta et al. | |
| 5,773,078 A | 6/1998 | Skelly | |
| 5,934,174 A * | 8/1999 | Abraham et al. | 92/222 |
| 5,958,332 A | 9/1999 | Hoeg | |
| 5,961,861 A | 10/1999 | McCay et al. | |
| 5,985,056 A | 11/1999 | McCay et al. | |
| 5,985,368 A | 11/1999 | Sangeeta et al. | |
| 6,001,426 A * | 12/1999 | Witherspoon et al. | 427/449 |
| 6,016,227 A | 1/2000 | Hopkins et al. | |
| 6,127,046 A * | 10/2000 | Worden et al. | 428/612 |
| 6,173,886 B1 | 1/2001 | McCay et al. | |
| 6,197,386 B1 | 3/2001 | Beyer et al. | |
| 6,229,111 B1 | 5/2001 | McCay et al. | |
| 6,284,067 B1 | 9/2001 | Schwartz et al. | |
| 6,294,225 B1 | 9/2001 | McCay et al. | |
| 6,299,707 B1 | 10/2001 | McCay et al. | |
| 6,303,232 B1 * | 10/2001 | Mihoya et al. | 428/472.2 |
| 6,328,026 B1 | 12/2001 | Wang et al. | |
| 6,350,326 B1 | 2/2002 | McCay et al. | |
| 6,354,269 B1 * | 3/2002 | Saito et al. | 123/436 |
| 6,602,550 B1 * | 8/2003 | Grant et al. | 427/252 |
| 6,973,723 B2 * | 12/2005 | Cagney et al. | 29/888.047 |
| 2002/0025386 A1 * | 2/2002 | Heinemann et al. | 427/446 |
| 2003/0068518 A1 * | 4/2003 | Ando et al. | 428/608 |
| 2003/0190770 A1 * | 10/2003 | Yeom et al. | 438/113 |
| 2003/0196547 A1 * | 10/2003 | Bischofberger et al. | 92/223 |
| 2004/0001966 A1 * | 1/2004 | Subramanian et al. | 428/679 |
| 2004/0003793 A1 * | 1/2004 | Saruwatari et al. | 123/307 |
| 2005/0092279 A1 * | 5/2005 | Parker et al. | 123/193.6 |

FOREIGN PATENT DOCUMENTS

| | | | |
|---|---|---|---|
| EP | 0 521821 A2 | 6/1992 | |
| EP | 0 529208 A1 | 3/1993 | |
| JP | 362056562 A * | 3/1987 | 219/121.68 |

OTHER PUBLICATIONS

"High-Density-Infrared Transient Liquid Coatings" by Craig A. Blue et al., article from "JOM," pp. 1-8, Jan. 31, 2001.

"Low Load Abrasive Wear Behaviour of Plasma Spray and Laser-Melted Plasma Coatings" by M. Boas et al., article from "Elsevier Sequoia," pp. 197-210 (1988) The Netherlands.

"Spraying TiN by a Combined Laser and Low-Pressure Plasma Spray System" by A. Ohmori et al., article from "Journal of Thermal Spray Technology," pp. 137-144, Jun. 1993.

"Corrosion of Spray Coatings" by S.C. Tjong et al., article from Scripta Metallurgica et Materialia, vol. 31, No. 7, pp. 835-839, 1994.

"Investigation of the Structural 7 Phase Transformations . . ." by V. A. Klimenov et al., from "Proceedings of ITSC '95," pp. 1005-1009, Kobe, May 1995.

"Laser-Assisted Plasma Spray Coating Method . . ." by S. Sasaki et al., from "Proceedings of ITSC '95," pp. 267-271, Kobe, May 1995.

"Laser Glazing of Vacuum Plasma Spray Coated NARloy-Z" by J. Singh et al., from "Elsevier Science S.A.," pp. 35-49, 1996.

"Performance of Laser-Consolidated Plasma-Spray Coatings . . ." by S. C. Tjong, from "Elsevier Science S.A.," pp. 95-100, 1996.

"Tribological Properties of Several Coating Films . . ." by S. Sasaki, from "Surface Modification Technologies X," pp. 1-12, 1997.

"Laser Surface Alloying of AISI 1050 Mild Steel . . ." by H. C. Man et al., a publication of Hong Kong Polytechnic Univ., pp. 141-150, Section D-ICALEO 2000.

"Laser Pyrolysis of Polysilazane—A New Technique . . ." by H. J. Kraus et al., from "Key Engineering Materials," vols. 206-213 (2002) pp. 467-470.

"Laser Heat Treatment of Air Plasma Sprayed NiCrAlY Overlay Coatings" by K. Kobylanska-Szkaradek, from Inzynieria Materialowa, vol. XXII, pp. 454-457, 2001.

"Return to the Planet Snerznak—All About Emcrawlees" by F. J. Hermanek, brochure from "Praxair Surface Technologies," pp. 1-3, Oct. 26, 1999.

* cited by examiner

THERMAL OXIDATION PROTECTIVE SURFACE FOR STEEL PISTONS

BACKGROUND OF THE INVENTION

1. Field of the Invention

The subject invention relates to a piston for a diesel engine and method of making such a piston having a crown specially treated to resist thermal oxidation degradation and, more particularly, to such a piston of the steel type used in fuel-injected diesel engine applications.

2. Related Art

A diesel engine is a reciprocating-piston engine operating on the well-known thermodynamic cycle in which air is compressed, fuel is injected into the compressed charge, the auto-combusting mixture expanded to do work on the piston, and the products exhausted at completion of the cycle. In large steel pistons such as used in diesel truck applications, it is common to utilize a multiple-orifice nozzle to inject fuel during the combustion process. The nozzle with multiple orifices is located as centrally as possible above the piston crown and discharges fuel in a radial spray pattern. A depressed bowl in the piston crown is designed to ensure that the air-fuel mixture formed from the injection spray and the rotating air during injection completely fills the combustion space for optimal performance. If the air-fuel mixture fails to completely fill the bowl in the piston crown, both air utilization and power output will suffer. As a result, there will be a substantial decrease in the anti-polluting emission characteristics. Likewise, if there is an overlap and the mixture extends beyond the space between the individual injection events, the resulting excessive local fuel concentration will lead to air deficiencies and increased soot formation, again, decreasing the anti-polluting emission characteristics of the engine.

In addition to these timing issues, another problem contributes to a loss of the anti-polluting emission characteristics designed for the piston. Because the fuel injected into a diesel engine ignites spontaneously, high Cetane Number fuels are required. The burning fuel plumes generate intense heat. The bowl formed in the crown of the steel piston typically experiences oxidation in areas in close vicinity to and/or on the top edge of the combustion bowl, i.e., the lip-like interface between the bowl and the flat top rim of the piston crown. The result is a plume of radially extending torches extending from the multiple-orifice nozzle. This torching effect oxidizes the steel up to $Fe_2O_3$ status, and the resultant oxides have no adherence to the underlying, unaffected steel substrate. Mechanical expansion/contraction processes eventually dislodge this oxidized layer in a "flaking" manner. Over time, an eroded area can be seen with the naked eye. This change in the shape of the bowl lip causes disturbances in the combustion process and contributes to a loss of the anti-polluting emission characteristics designed into the combustion bowl of the piston crown. Besides, the eroded areas weaken the piston structurally. Piston flexing, expansion, and contraction may induce radial cracks which propagate and could eventually lead to piston functional failure.

Various attempts have been proposed to address the issue of bowl lip oxidation resulting from the intense heat release by combusting fuel. For example, some have proposed to fabricate the entire piston crown from a specially formulated alloy designed to combat oxidation and corrosion. However, the piston crown in a large diameter piston for truck applications requires a significant amount of material. Such specially formulated alloys would significantly increase the cost of a diesel piston.

Other prior art attempts to address this issue include U.S. Pat. No. 5,958,332 to Hoeg, granted Sep. 28, 1998. In this example, a special plate fabricated from a high temperature, corrosion resistant alloy is welded to the critical areas of a piston or other engine component. However, the loose-piece fabrication of a special alloy plate significantly increases the cost of the piston assembly, as well as adding numerous handling and assembly steps to the fabrication process. In examples, proposals have been made to shrink-fit an annulus of high temperature resistant steel or even a ceramic-based material into the combustion bowl. However, the same restrictions outlined before apply. Accordingly, there is a long-felt and as yet unsolved need to address the issue of piston crown degradation in low-cost steel pistons resulting from oxidation and the intense heat released by diesel engine combustion in close proximity to the combustion bowl lip. A commercially practical solution must be convenient to implement without increasing the overall product or manufacturing costs, while retaining long term piston emission compliance performance.

SUMMARY OF THE INVENTION

According to the subject invention, a method for improving the oxidation and corrosion resistance of a piston crown for an internal combustion engine is provided. The method comprises the steps of providing a piston having a crown presenting an exterior crown surface; preparing a coating material consisting essentially of a corrosion-resistant and oxidation-resistant composition; applying the coating material to the piston crown such that the coating material adheres to the crown surface having an as-applied microstructure and an as-applied porosity less than 100% full material density. The method further includes the step of irradiating the coating with a high energy laser beam to increase the density of the coating while simultaneously reforming the microstructure and creating a material bond between the coating and the crown surface. The irradiating step actually alloys the coating and the material of the crown surface, thereby generating a composite material of properties varying from both that of the original coating and crown surface material.

According to yet another aspect of the subject invention, a method for operating a steel piston in a fuel-injected diesel engine is provided. The method comprises the steps of providing an engine cylinder having a cylinder head; providing a piston having a crown including a generally annular rim and a concave bowl set below the rim, the interface between the rim and the bowl forming a generally annular lip; reciprocating the piston in the cylinder toward and away from the cylinder head; forcibly discharging liquid fuel into the cylinder and toward the lip of the piston crown; and combusting the fuel adjacent the lip of the piston crown. The step of providing a piston includes altering the surface composition of the lip of the piston crown by applying a coating material consisting essentially of a corrosion-resistant and oxidation-resistant composition to the lip having an as-applied microstructure and an as-applied porosity less than 100% full material density, and then irradiating the applied coating with a high energy laser beam to increase the density of the coating while simultaneously reforming its microstructure and creating a material bond between the coating and the lip.

According to yet another aspect of the subject invention, a piston for a fuel-injected diesel engine is provided. The piston comprises a generally cylindrical skirt having a pair of opposing pin bores formed transversely therein. A crown is affixed atop the skirt. The crown includes a generally annular rim and a concave bowl set below the rim. A generally annular lip is established along the interface between the rim and the bowl. The lip has a bonded surface treatment consisting essentially of an applied, corrosion-resistant and oxidation-resistant composition irradiated with a high energy laser beam.

The subject method and piston structure overcome the shortcomings and deficiencies of prior art pistons by intentionally preparing and treating the lip region of the piston crown, comprising the interface between the annular rim and the concave bowl so that it can better withstand the abusive effects of combusting liquid fuel injected from an injector nozzle toward the lip. A relatively low-cost steel piston made and operated according to the subject invention can achieve substantially longer service life and is capable of maintaining long term piston emission compliance performance, as well as piston structural integrity.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
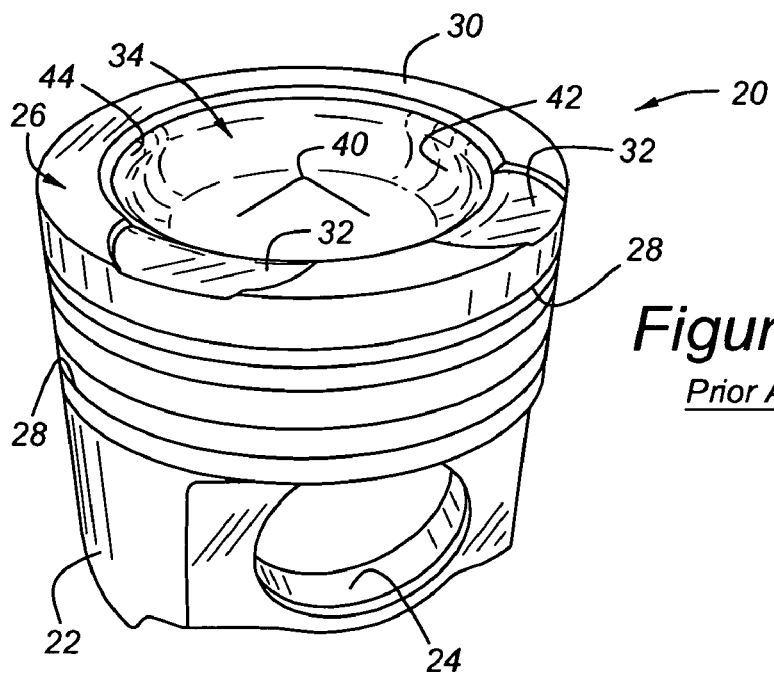
FIG. 1 is a perspective view of a prior art steel piston for a diesel engine.

Referring to the figures, wherein like numerals indicate like or corresponding parts throughout the several views, a steel piston for a fuel-injected diesel engine is generally shown at 20 in FIG. 1. The piston 20 is of the type adapted for use in a fuel-injected diesel engine. The piston 20 comprises a generally cylindrical skirt portion 22, having a pair of opposing pin bores 24 formed transversely therein. The skirt 22 guides and supports the piston 20 as it reciprocates in the cylinder (not shown) of a diesel engine, while the pin bores 24 receive a wrist or gudgeon pin, which attaches to the upper end of a connecting rod (not shown) and, ultimately, to the crank shaft of the engine. A crown, generally indicated at 26, is affixed atop the skirt 22. In the preferred embodiment of this invention, the skirt 22 and crown 26 are integrally formed of a unitary steel material. The composition of material can be selected from any of the known varieties, including but not limited to the relatively low-cost SAE 4140 H. Instead of the depicted single-piece design, the piston 20 could be of the so-called "articulating" type, wherein the crown 26 can pivot slightly relative to the skirt 20 through a common connection about the wrist pin.

The crown 26 includes a plurality of ring grooves 28 to receive compression and/or oil rings (not shown). The ring grooves 28 are formed into the cylindrical outer, sliding surface of the crown 26 which, at its upper end, intersects a crown rim 30. The rim 30 is a generally flat, annular region comprising the uppermost, top portion of the piston 20. Commonly, although not necessarily, one or more valve pockets 32 are formed into the rim 30 to provide clearance space for the exhaust and/or intake valve heads 25 (shown in phantom in FIG. 3) when the piston 20 is in its top dead center ("TDC") position.

Figure 3:
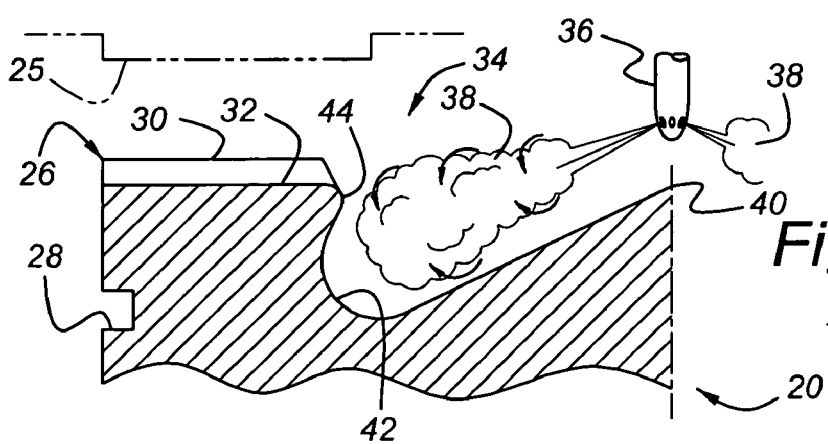
FIG. 3 is a fragmentary cross-sectional view taken generally along Lines 3-3 in FIG. 2.

The center inner region of the crown 26, bounded by the rim 30, is known as the bowl, and is generally indicated at 34. The bowl 34 comprises a combustion-chamber segment formed as a cavity in the top of the piston crown 26. A multi-orifice nozzle 36, centered above this extended combustion recess in the crown 26, injects the fuel in a plurality of radial jets or plumes 38. The configuration of the nozzle 36 and its projected fuel plume 38 utilizes the depressed and swirling configuration of the bowl 34, combined with the energy in the injected fuel stream to optimize the space in which the air and fuel interact and combustion of the fuel develops. The bowl 34 may include a peaked or domed center, which falls away toward a recessed trough 42. The trough 42 is a generally annular feature whose upper, ascending face rejoins the rim 30. The interface between the rim 30 and the ascending face of the trough 42 comprises a generally annular lip 44, which may or may not slightly overhang the trough 42 as shown in FIG. 3.

Figure 2:
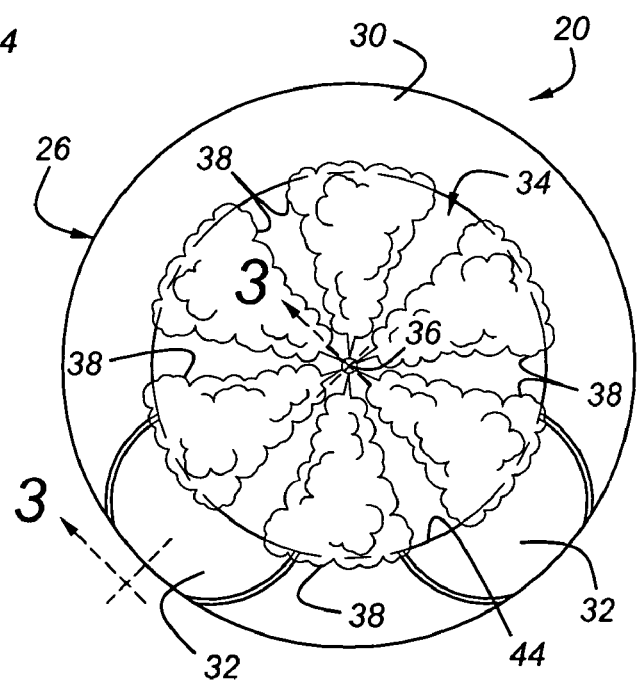
FIG. 2 is a top view of a prior art piston as in FIG. 1 and depicting a centrally located multiple-orifice fuel injection nozzle with a plurality of radially extending fuel injection sprays.

In the average diesel engine, the plume of injected fuel 38 initiates at about 5° before top dead center ("BTDC") and continues until about 10° after top dead center ("ATDC") of piston movement. As such, the plume 38, whose trajectory remains generally constant, strafes a surface area of the piston crown 26 which can be characterized as the plume contact zone. The plume contact zone is, therefore, that portion of the exposed crown surface that is targeted by the fuel injection plume 38 from about 5° BTDC to about 10° ATDC of piston movement within the cylinder, including the upper, ascending surface of the trough 42, the lip of 44, and the rim 30, together with the valve pockets 32. The plume contact zone generally does not include the entire exposed surface area of the bowl 34. Because of the intense heat released by the combustion of the fuel in close proximity to the plume contact zone, the steel composition of the piston crown 26 in a prior art piston has a tendency to oxidize up to $Fe_2O_3$ status. The oxides which result from the transformation no longer adhere to the substrate steel material and are rapidly dislodged as flakes through expansion and contraction processes. Over time but well inside what should otherwise be the useful life of an engine, the expanding eroded areas significantly deteriorate the anti-polluting emission characteristics designed into the combustion bowl 34 of the piston 20. Structural integrity can, with time, be severely compromised as well. As perhaps best shown in FIG. 2, these eroded areas will be most pronounced in those regions of the lip 44 coinciding with the spray plumes 38.

Referring now to FIGS. 4-12, an improved piston and method for making and operating an improved piston according to the subject invention is shown. For convenience, reference numbers corresponding to those set forth above are applied to corresponding features of the piston, but with the prefix "1" distinguishing the subject invention from the prior art.

Figure 4:
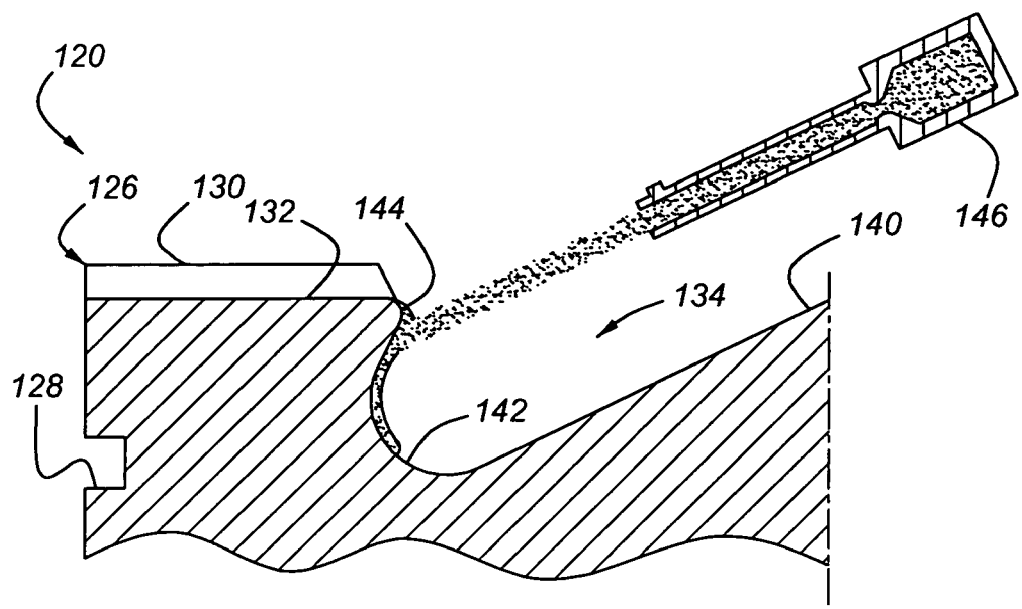
FIG. 4 is a fragmentary cross-section of a steel diesel engine piston according to the subject invention illustrating the process of forcibly propelling a spray material of corrosion-resistant and oxidation-resistant composition onto the most vulnerable portions of the piston crown.
Figure 5:
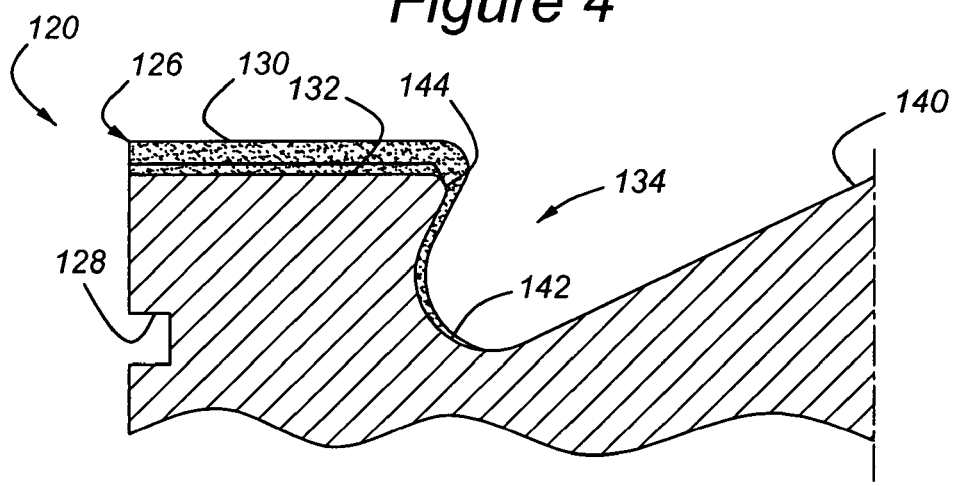
FIG. 5 is a cross-sectional view as in FIG. 4, but showing all of the vulnerable areas of the piston crown having been coated with the durable coating material.

The subject invention is directed toward a piston 120 having a crown 126 whose surface is modified and enhanced in the plume contact zone so as to better withstand the intense heat released by diesel engine combustion in close vicinity to the surface of the crown 126. FIGS. 4 and 5 depict a fragmentary cross-section of the piston crown 26 as it is sprayed or otherwise treated with a corrosion-resistant and oxidation-resistant composition, such as Amdry 995C, Inconel 718, Stellite 6, nickel-chromium, chromium, or a mixture of these compositions. The corrosion-resistant composition can be applied as a paste-like slurry. Preferably, however, the coating process is carried out as a thermal spray process of either the combustion type or the electric arc type. Such processes have been known by the descriptive term "metalizing." Combustion-type thermal spray processes may include, but are not limited to, powder flame spray, wire/rod flame spray, detonation spray, and high velocity oxygen fuel ("HVOF") spray. Electric arc processes include, but are limited to, arc wire spray and plasma spray.

Using the HVOF spray process as an example, a pressurized chamber gun 146 uses the combustion of acetylene, hydrogen, propane, propylene, or the like to produce a hot, high-pressure flame. The flame is forced through a DeLaval nozzle to accelerate the carrier gas to supersonic velocities. Feed stock powder can be fed axially into the high-pressure combustion chamber 146 or directly through the side of the nozzle. Feed stock powders may be selected from the group of materials as set forth above. While HVOF is not the only thermal spray process capable of applying a satisfactory coating of corrosion-resistant and oxidation-resistant composition over the vulnerable surfaces of the piston crown 126, it is nevertheless an acceptable example of the variety of spray processes which can be used.

In addition to the traditional thermal spraying processes described above, it is also possible and included within the intended scope of this invention to utilize a so-called "cold spray" thermal spraying process. According to a cold spray technique, small particles in the 1-50 micron size are accelerated to supersonic velocities and applied to the surface of a work part. In one configuration, helium or nitrogen is injected at high pressure into a pressurized chamber and heated to 300°-700° C. Powder feed stock, such as one of the above-described corrosion-resistant and oxidation-resistant compositions, is introduced into the gas stream, which is not hot enough to melt the particles. The solid powder/gas mixture is then passed through a DeLaval nozzle, where the particles are accelerated to supersonic velocities. The particles impact the substrate with enough kinetic energy to produce a mechanical bond without melting and/or solidification, however, it does not produce a metallurgical bond.

Figure 6:
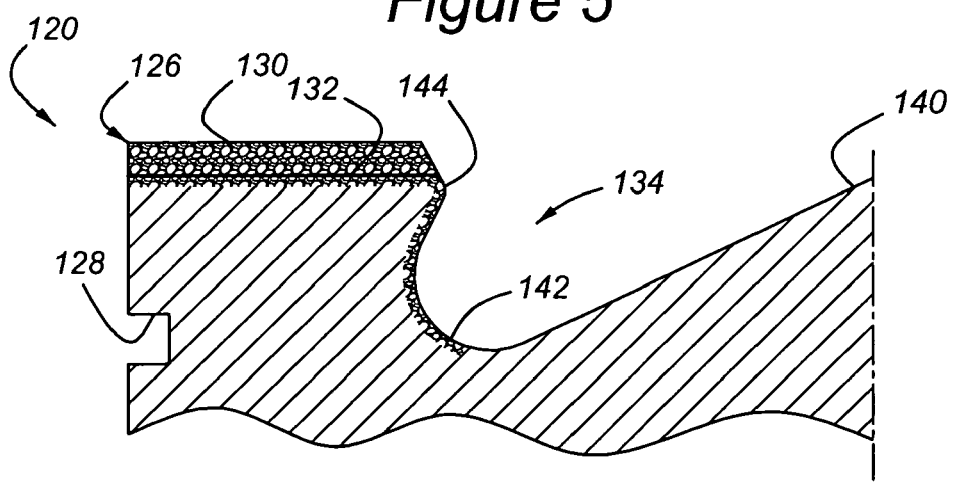
FIG. 6 is a fragmentary cross-sectional view of a piston crown as in FIG. 5, but depicting the surfaces after they have been irradiated with a high energy laser beam to increase the density of the coating while simultaneously reforming its microstructure and creating a material bond between the coating and the vulnerable areas of the piston crown.

FIG. 5 represents the piston crown 126 whose plume contact zone is fully coated with the spray material, forming a durable coating having an as-sprayed microstructure and as-sprayed porosity less than 100% full material density. In other words, the composition of the spray material, after it is fully applied to the relevant surface area of the crown 126, possesses a characteristic microstructure and a material density which is less than 100% fully dense. Those portions of the bowl 134 which are outside of the plume contact zone are not coated with the corrosion-resistant, oxidation-resistant material. To complete the transition of this piston crown 126 to the modified robust, long-life piston crown 126 according to the subject invention, a high energy laser beam is then used to irradiate the spray material coating causing a fusion of the coating material, together with the underlying steel substrate of the piston crown 126. One example of such a laser beam is generated by a so-called High-Power Direct Diode Laser ("HPDL"). The two materials (coating and substrate) intermix under the influence of the laser beam and alloy themselves so as to increase the density of the coating above that of its as-sprayed condition (FIG. 5), while simultaneously reforming the microstructure of the coating. Furthermore, a material bond between the coating and the crown substrate is established by the subsequent irradiation process. The resulting modified piston crown 126 is depicted in FIG. 6.

Because the surface geometry of a piston crown 126 over its plume contact zone is complex, numerous passes and orientations of the high energy laser beam are required to fully and evenly irradiate the as-sprayed coating. In order to prevent certain areas of as-sprayed coating from being irradiated at an unintended angle of incidence relative to the laser beam, it is preferred to mask certain portions of the coating both prior to and subsequent to the irradiation process.

Figure 7:
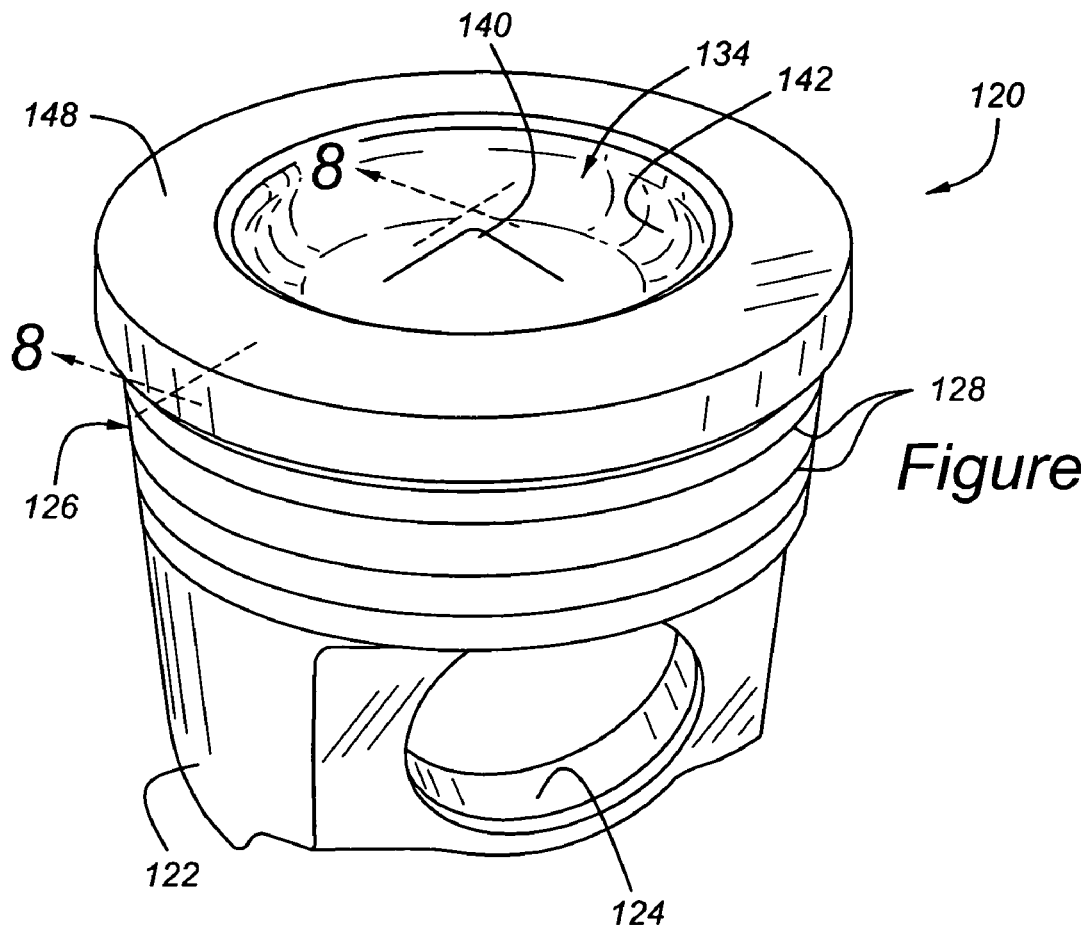
FIG. 7 is perspective view of a piston according to the subject invention and including a first annular mask applied over the rim section of the piston crown to prevent unwanted irradiation on certain portions of the coated surface.
Figure 8:
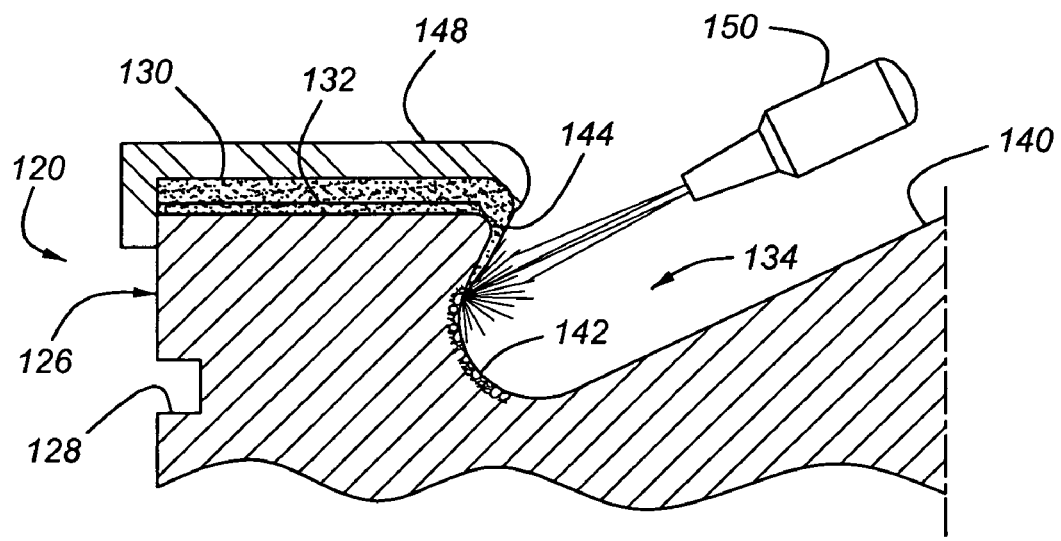
FIG. 8 is a fragmentary cross-sectional view taken generally along Lines 8-8 in FIG. 7 depicting a high energy laser beam irradiating the coating in the bowl region of the piston crown upon which the first mask is applied.

Turning now to FIGS. 7 and 8, a first mask is generally indicated at 148. The first mask temporarily covers the coating in the areas of the rim 30 and valve pockets 32, while exposing the coating applied in the region of the trough 142. Thus, while the first mask 148 is in place, a high energy laser 150 is free to irradiate that portion of the trough 142 to which the coating material has been applied (i.e., in the plume contact zone). As depicted, the region of the trough 142 below the focal point of the laser 150 is shown as having been reformed by the fusing qualities of the laser beam so that the coating material is now alloyed and materially bonded to the substrate steel material. In this example, the laser 150 is moving its beam in an upwardly ascending path so that as it progresses toward the lip 144, all of the coating material applied to the trough 142 will eventually be fully irradiated and reformed into a material bond with the steel piston crown 126. In the preferred embodiment, however, a laser 150 is selected from the type having a rectangular beam of approximately 12 mm×0.5 mm at focus. The long axis of the beam encompasses the trough 142 to the lip 144 in a vertical direction, but is fixed in this vertical position. The beam and piston move relative to each other around the circumference, such as by fixing the laser and rotating the piston, so that the long axis of the beam sweeps out the treated area. The resulting fused coating substantially enhances the physical characteristics of the crown 126, thereby avoiding the problem of oxidation and permitting the continued use of a standard piston steel material, such as SAE 4140 H. Accordingly, the subject invention represents a lower cost solution than other prior art attempts to overcome the problems associated with rim and bowl oxidation.

As the laser 150 traverses its application area within the bowl 134, the piston 120 may be rotated and/or the laser 150 may be rotated so that the entire annular region of coated surface area is adequately irradiated. Should the focal point of the laser 150 extend above the trough 142, it will contact the first mask 148 and be reflected harmlessly away from the piston crown 126. This is because the first mask 148 is made from a reflective and thermally conductive metallic material, such as polished copper.

Figure 9:
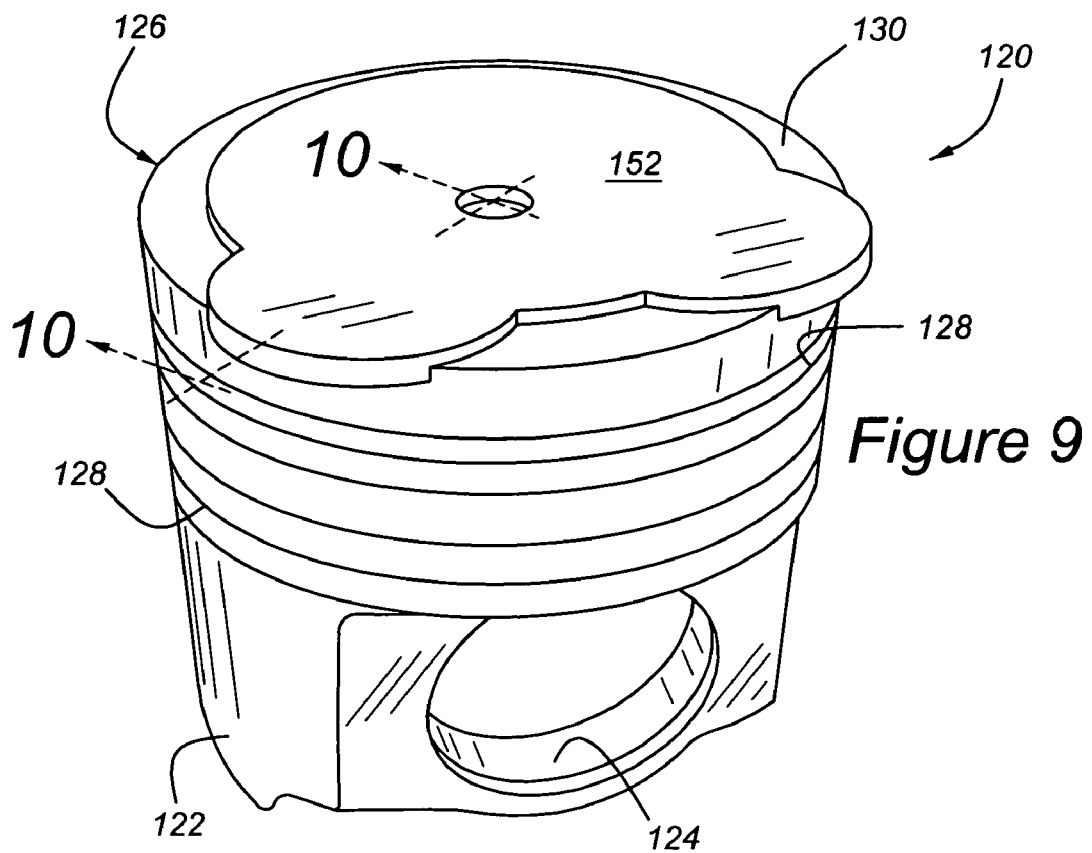
FIG. 9 is a perspective view of the piston including a second mask covering the bowl region and the valve pockets so as to expose only the flat, upper rim section of the piston crown.
Figure 10:
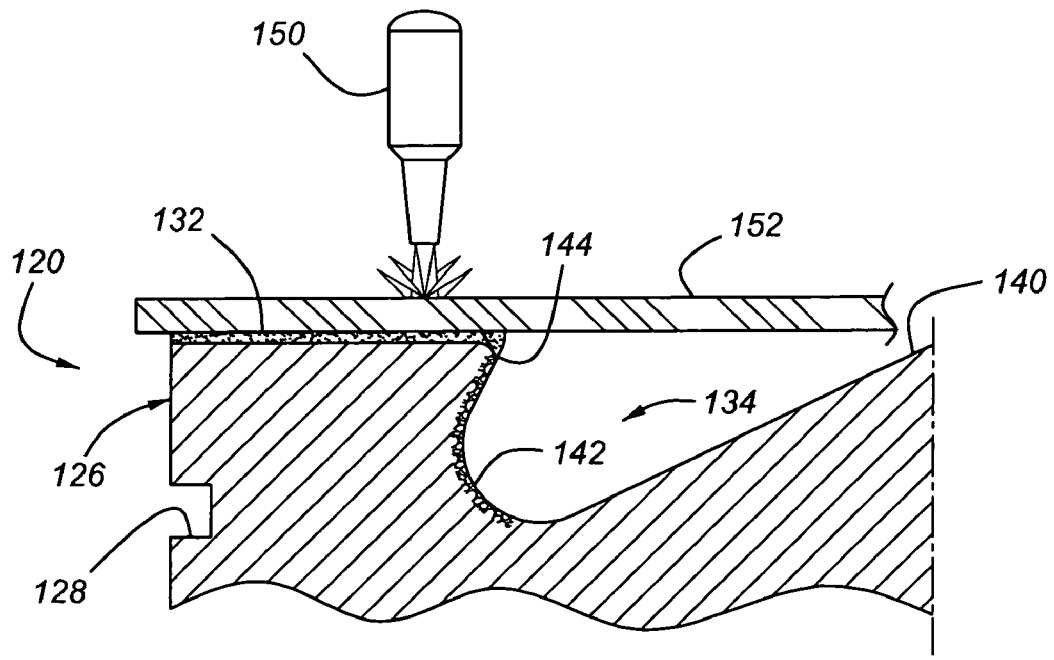
FIG. 10 is a fragmentary cross-sectional view taken generally along Lines 10-10 in FIG. 9 and depicting a laser beam reflecting off of the second mask so as not to irradiate the valve pockets while in the process of irradiating the coating on the rim section.

Once the trough 142 region has been adequately irradiated, attention can be directed toward the rim 130, which has also been coated by the spray material. However, because the valve pockets 132 are depressed below the surface of the rim 130, the focal point of the laser 150 may not be optimized to effectively irradiate the coating in the region of the valve pockets 132 at the same time as the rim 130. Therefore, a second mask 152 may be used, as shown in FIG. 9. The second mask 152 may also be made from the reflective metallic shield-like material, such as polished copper, and be structured so as to cover the valve pockets 132. The only exposed portions of the spray coated piston crown 126 thereby comprise the rim surface 130. With the unintended areas effectively shielded by the second mask 152, the laser 150 can be repositioned to irradiate the coated surface of the rim 130 as shown in FIG. 10. Again, the piston 120 and/or the laser 150 may be rotated to cover the entire rim 130 surface in an efficient manner. Whenever the beam from the laser 150 strikes the second mask 152, as shown in FIG. 10, it is reflected harmlessly away from the crown 126, and any absorbed heat is quickly dissipated. By this method, the valve pockets 132 are protected from being irradiated by the laser 150 at a non-ideal setting. The second mask 152 also helps to avoid excessive melting in the corners and along the edges of the valve pockets 132. Furthermore, the trough portion 142 is protected from subsequent attack by the laser 150, which might otherwise result in unintended metallurgical reformation of the already irradiated surfaces.

Figure 11:
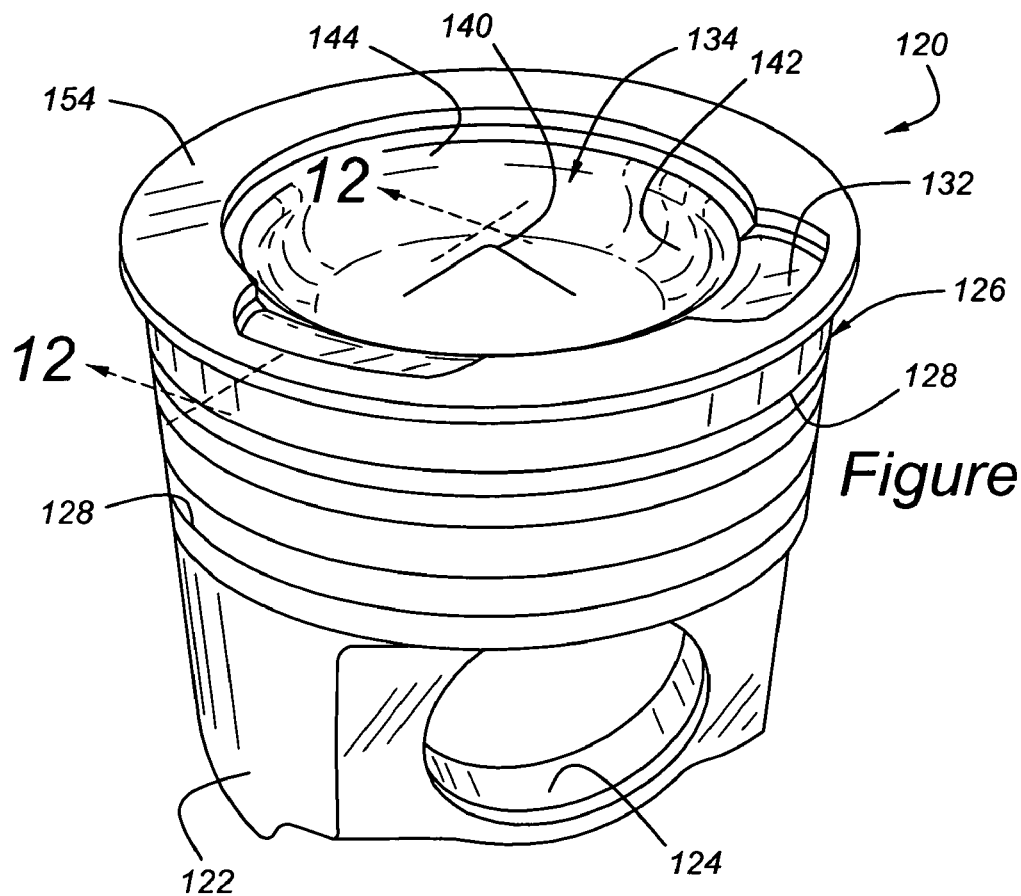
FIG. 11 is a perspective view of the piston showing a third mask applied to the top of the piston crown and exposing only the valve pockets so that the coating in this region can be irradiated by the high energy laser beam.
Figure 12:
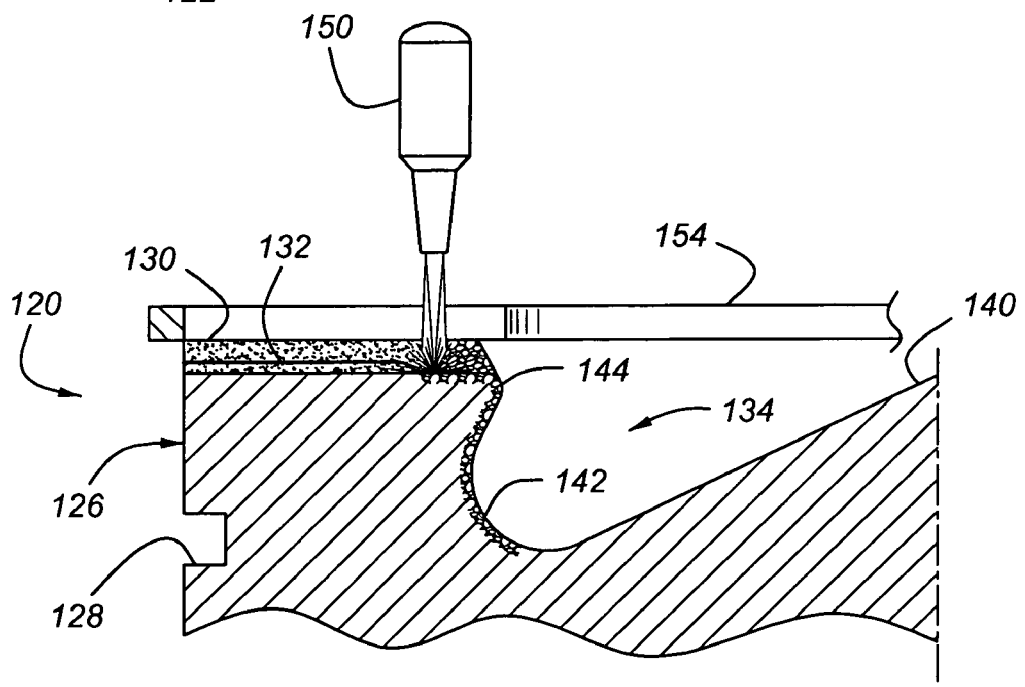
FIG. 12 is a fragmentary cross-sectional view taken generally along Lines 12-12 in FIG. 11 and depicting the high energy laser beam irradiating the coating in the region of the valve pocket to complete the surface preparation of the crown of the piston.

To complete the full irradiation of the as-sprayed coating on the piston crown 126, a third mask 154 is applied to the top of the piston crown 126 after the second mask 152 has been removed. As depicted in FIG. 11, the third mask 154 is designed to cover the already irradiated rim portion 130 and to leave open the area of the valve pockets 132. Thus, the position of the laser 150 can be reset so that its focal point is gauged to the depth of the valve pockets 132, as shown in FIG. 12. The irradiation process can again take place with relative movement between the crown 126 and the laser 150 being accomplished by rotation or other guided relative movement between the two components. As the beam of the laser 150 passes out of the valve pockets 132 and into the region of the rim 130, the third mask 154 will harmlessly reflect the light energy away from the rim surface 130, thereby protecting the already reformed surfaces from further unwanted interaction with the high energy laser beam 150. The third mask 154 further helps to avoid excessive melting in the corners and along the edges of the valve pockets 132.

Although many different types of lasers may be employed to effectively accomplish the irradiating step of the subject invention, a high powered direct diode laser has been found to produce acceptable results.

It will be appreciated that the first 148, second 152, and third 154 masks can be deployed in sequences other than those described above. Furthermore, fewer than three or more than three masks may be required during the irradiation step to effectively reform the coating material as described herein. Furthermore, while very specific coating materials have been proposed hereinabove for use, these are not the only suitable materials. Rather, any coatings suitable for use in a fusing operation using industrial layers may be employed. For example, as is may be known from the field of gas turbines, various common and proprietary powders may be known to resist high temperature oxidation. Any such known materials may be used, provided that the fused coatings conform to the contours of the plume contact zone without cracking, corrosion, or thermal oxidation. Another advantage of the fused piston crown surface, according to this invention, results in the ability to post-machine, if needed, the irradiated surfaces without chipping or flaking away the sprayed coating. This subject method can be accomplished in high production settings in a fast cycle time and can be demonstrated to be repeatable and amenable to very precise computerized control. The process is highly adaptable to in-line production processes as well.

Obviously, many modifications and variations of the present invention are possible in light of the above teachings. It is, therefore, to be understood that within the scope of the appended claims, the invention may be practiced otherwise than as specifically described.

What is claimed is:

1. A method for improving the corrosion resistance of a piston crown for an internal combustion engine, said method comprising the steps of:
providing a piston having a crown presenting an exterior crown surface;
preparing a coating material consisting essentially of a corrosion-resistant and oxidation-resistant composition;
applying the coating material to the piston crown such that the coating material adheres to the crown surface having an as-applied microstructure and an as-applied porosity less than 100% full material density;
irradiating the coating with a high energy laser beam to increase the density of the coating while simultaneously reforming the microstructure and creating a material bond between the coating and the crown surface; and
masking a portion of the coating to prevent irradiation from the laser beam.

2. The method of claim 1 wherein said masking step includes temporarily covering a portion of the crown with a reflective metallic shield.

3. The method of claim 2 wherein the piston crown includes a generally annular rim and a concave combustion bowl set below the rim, said step of temporarily covering a portion of the crown including covering one of the rim and the bowl but not the other of the rim and the bowl.

4. The method of claim 3 wherein the piston crown includes at least one valve pocket formed into the rim, said step of temporarily covering a portion of the crown including covering one of the rim and the valve pocket but not the other of the rim and the valve pocket.

5. The method of claim 1 wherein said step of applying the coating material includes forcibly propelling the spray material toward the piston crown into a gaseous flow generated by a combustion process.

6. The method of claim 5 wherein said step of placing the spray material into a gaseous flow includes forcing the gaseous flow through an accelerator nozzle.

7. The method of claim 1 wherein said step of forcibly propelling the spray material includes producing a DC electric arc.

8. The method of claim 7 wherein said step of producing a DC electric arc includes ionizing an inert gas to produce a high-temperature plasma jet.

9. The method of claim 1 wherein said step of irradiating the coating includes employing a high-power direct diode laser.

10. The method of claim 1 wherein said step of forcibly propelling the spray material includes applying the spray material to less than all of the exterior crown surface.

11. The method of claim 1 wherein said step of providing a piston includes forming the piston from a material composition including a steel alloy.

12. The method of claim 1 wherein the exterior crown surface has a plume contact zone comprising that portion of the exterior crown surface to be subsequently targeted by a fuel injection plume from about 5° BTDC to about 10° ATDC of piston movement within a cylinder, and said step of forcibly propelling the spray material includes the step of coating the plume contact zone of the exterior crown surface but not the entire exterior crown surface.

13. A method for operating a steel piston in a fuel-injected diesel engine, said method comprising the steps of:
providing an engine cylinder having a cylinder head;
providing a piston having a crown including a generally annular rim and a concave bowl set below the rim, the interface between the rim and the bowl forming a generally annular lip;
reciprocating the piston in the cylinder toward and away from the cylinder head;
forcibly discharging liquid fuel into the cylinder and toward the lip of the piston crown;
combusting the fuel adjacent the lip of the piston crown;
said step of providing a piston including altering the surface composition of the lip of the piston crown by applying a coating material consisting essentially of a corrosion-resistant and oxidation-resistant composition to the lip having an as-applied microstructure and an as-applied porosity less than 100% full material density, and irradiating the lip coating with a high energy laser beam to increase the density of the coating while simultaneously reforming the microstructure and creating a material bond between the coating and the lip;
said step of providing a piston further including altering the surface composition of the rim of the piston crown by forcibly propelling a spray material consisting essentially of a corrosion-resistant and oxidation-resistant composition toward the rim such that the particles of spray material plastically deform upon impact with the rim, and wherein the spray material adheres to the rim as a durable coating having an as-sprayed microstructure and an as-sprayed porosity less than 100% full material density, and irradiating the rim coating with a high energy laser beam to increase the density of the coating while simultaneously reforming the microstructure and creating a material bond between the coating and the rim;
said step of providing a piston further including altering the surface composition of at least a portion of the bowl of the piston crown by forcibly propelling a spray material consisting essentially of a corrosion-resistant and oxidation-resistant composition toward the bowl such that the particles of spray material plastically deform upon impact with the bowl, and wherein the spray material adheres to the rim as a durable coating having an as-sprayed microstructure and an as-sprayed porosity less than 100% full material density, and irradiating the bowl coating with a high energy laser beam to increase the density of the coating while simultaneously reforming the microstructure and creating a material bond between the coating and the bowl;
and wherein said step of irradiating the rim coating does not overlap in time with said step of irradiating the bowl coating.

14. A piston for a fuel-injected diesel engine, said piston comprising:
a generally cylindrical skirt having a pair of opposing pin bores formed transversely therein;
a crown affixed atop said skirt, said crown including a generally annular rim and a concave bowl set below said rim, and a generally annular lip along the interface between said rim and said bowl;
said lip having a bonded surface treatment consisting essentially of an applied corrosion-resistant and oxidation-resistant composition irradiated with a high energy laser beam;
said piston crown being fabricated from a base material composition consisting essentially of steel;
said rim having a bonded surface treatment consisting essentially of a sprayed-on corrosion-resistant and oxidation-resistant composition irradiated with a high energy laser beam;
at least a portion of said bowl having a bonded surface treatment consisting essentially of a sprayed-on corrosion-resistant and oxidation-resistant composition irradiated with a high energy laser beam; and
wherein said sprayed-on corrosion-resistant and oxidation-resistant composition of said bonded surface treatment is selected from the group consisting of: Amdry 995 C, Inconel 718, Stellite 6, Nickel-Chromium, Chromium, and alloys thereof.

* * * * *